United States Patent
Blea et al.

(10) Patent No.: US 6,212,531 B1
(45) Date of Patent: Apr. 3, 2001

(54) METHOD FOR IMPLEMENTING POINT-IN-TIME COPY USING A SNAPSHOT FUNCTION

(75) Inventors: David Randall Blea; Donald Reynold Blea; Mark Alan Haye; Ronald Maynard Kern; David M. Shackelford; John G. Thompson, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/006,548

(22) Filed: Jan. 13, 1998

(51) Int. Cl.[7] ........................................ G06F 17/30
(52) U.S. Cl. ........................................................ 707/204
(58) Field of Search .................................. 707/200–204; 711/161, 162

(56) References Cited

U.S. PATENT DOCUMENTS

| | | | |
|---|---|---|---|
| 5,210,866 | * | 5/1993 | Milligan et al. ........................ 714/6 |
| 5,403,639 | | 4/1995 | Belsan et al. ........................ 707/204 |
| 5,410,667 | | 4/1995 | Belsan et al. ........................ 711/114 |
| 5,495,607 | * | 2/1996 | Pisello et al. ........................ 707/10 |
| 5,555,371 | * | 9/1996 | Duyanovich et al. ................. 714/13 |
| 5,649,152 | * | 7/1997 | Ohran et al. ........................ 711/114 |
| 5,678,042 | * | 10/1997 | Pisello et al. ........................ 714/47 |
| 5,781,912 | * | 7/1998 | Demers et al. ........................ 707/202 |
| 5,901,327 | * | 5/1999 | Ofek ........................................ 710/5 |
| 5,905,201 | * | 9/1999 | Van Huben et al. .................. 707/10 |
| 5,933,820 | * | 8/1999 | Beier et al. ........................... 707/1 |
| 5,974,563 | * | 10/1999 | Beeler, Jr. ............................ 714/5 |

OTHER PUBLICATIONS

IBM Corporation, Jul. 1997, IBM Ramac Virtual Array, IBM Doc. No. SG24–4951–00 (selected portions only).

* cited by examiner

*Primary Examiner*—Maria N. Von Buhr
(74) *Attorney, Agent, or Firm*—David W. Victor; Konrad Raynes & Victor

(57) ABSTRACT

A method, apparatus, and article of manufacture for performing a point-in-time backup using a snapshot function. Work space on a work virtual volume is obtained to hold the snapshot copy of the source data being copied from a source virtual volume. Updates to the source virtual volume are suspended during the snapshot function, so as to provide a logically consistent view of the source virtual volume at a common point in time. Pointers are copied from a virtual track table of the source virtual volume to a virtual track table of the work virtual volume without actually moving any data on data storage devices referenced by those pointers. As a result, the snapshot function provides a method for copying the source virtual volume to the work virtual volume very quickly. Upon completion of the snapshot function, updates to the source virtual volume may be resumed. Subsequently, a backup is performed in the usual manner, except that the backup retrieves the source data from the work virtual volume rather than the source virtual volume.

20 Claims, 5 Drawing Sheets

METHOD FOR IMPLEMENTING POINT-IN-TIME COPY USING A SNAPSHOT FUNCTION

CROSS-REFERENCE TO RELATED APPLICATION

This application is related to co-pending and commonly-assigned patent application Ser. No. 09/006,638, filed on same date herewith, by Mark A. Haye, Ronald M. Kern, and David M. Shackelford, entitled "POINT-IN-TIME BACKUP UTILIZING MULTIPLE COPY TECHNOLOGIES," which application is incorporated herein by reference.

BACKGROUND OF THE INVENTION

1. Field of the Invention

This invention relates in general to improvements in the field of computer systems having backup/restore or archive/retrieve subsystems, and more particularly, to a method for implementing point-in-time copy operations using snapshot functions.

2. Description of Related Art

In a data processing system, a backup/restore subsystem is typically used to save a recent copy or version of one or more data sets or portion thereof on some form of backup data storage device, such as magnetic or optical disk drives, tape drives, or other memory. The backup/restore subsystem is used to protect against loss of data. For example, if an on-line version of one or more data sets is destroyed, corrupted, deleted, or changed because of power failure, hardware, or software error, user error or some other type of problem, the latest version of those data sets which are stored in a backup/restore subsystem can be restored and therefore the risk of loss of data is minimized. It is readily apparent that backup/restore subsystems are and will remain an important part of the field of data processing.

Successful recovery of data to a known consistent state requires a backup of all components of the data at the same consistent point in time. Generally, a point in time backup is a copy of the data which is logically consistent to a given point in time, with the: restriction that the amount of time to obtain logical consistency is significantly less than the amount of time to actually copy the data.

Concurrent copy, also known as time-zero copy, provides the ability to create a point-in-time backup. Concurrent copy is a point in time backup which uses a combination software and microcode architecture to obtain a copy of the original data at the time the backup was initiated. However, concurrent copy is usually only supported for data residing on storage subsystems which implement the concurrent copy functions.

One storage subsystem that does not support concurrent copy functions is the log-structured array subsystem (LSA). An LSA subsystem implements "virtual volumes", wherein each virtual volume is created using a "virtual track table" having pointers to "virtual tracks" (i.e., records) in a sequential byte stream, wherein updated tracks are written to a new location at the logical end of the byte stream and their associated pointers, are reset to the new locations. Thereafter, the tracks at the old location in the sequential byte stream are no longer needed and can be released as free space for reclamation and reuse.

In certain products, emulation functions performed by the LSA subsystem permit computer programs executed by a host processor coupled to the LSA subsystem to "view" the LSA subsystem as a standard direct access storage device (DASD) with sequentially numbered tracks. However, such emulation does not necessarily extend to all functions generally capable of being supported with standard DASD.

Currently available LSA subsystems do support a very fast copy function called a snapshot function, which operates by copying pointers between virtual track tables representing different virtual data volumes without actually moving any data. On the other hand, the snapshot function suffers from a restriction that the source and target locations must be within the subsystem, and the same device types. As a result, a straightforward backup copy using current snapshot functions does not achieve point-in-time backup on LSA subsystems.

Thus, there is a need in the art for methods for providing point in time backups on LSA subsystems, wherein the point-in-time backups use snapshot functions.

SUMMARY OF THE INVENTION

To overcome the limitations in the prior art described above, and to overcome other limitations that will become apparent upon reading and understanding the present specification, the present invention discloses a method, apparatus, and article of manufacture for performing a point-in-time backup using a snapshot function. Work space on a work virtual volume is obtained to hold the snapshot copy of the source data being copied from a source virtual volume. Updates to the source virtual volume are suspended during the snapshot function, so as to provide a logically consistent view of the source virtual volume at a common point in time. Pointers are copied from a virtual track table of the source virtual volume to a virtual track table of the work virtual volume without actually moving any data on data storage devices referenced by those pointers. As a result, the snapshot function provides a method for copying the source virtual volume to the work virtual volume very quickly. Upon completion of the snapshot function, updates to the source virtual volume may be resumed. Subsequently, a backup is performed in the usual manner, except that the backup retrieves the source data from the work virtual volume rather than the source virtual volume.

One object of the present invention is that it the point-in-time backup using the snapshot function may be performed on multiple subsystems or target data storage devices that are different from the source data storage device.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

HARDWARE ENVIRONMENT

Figure 1:
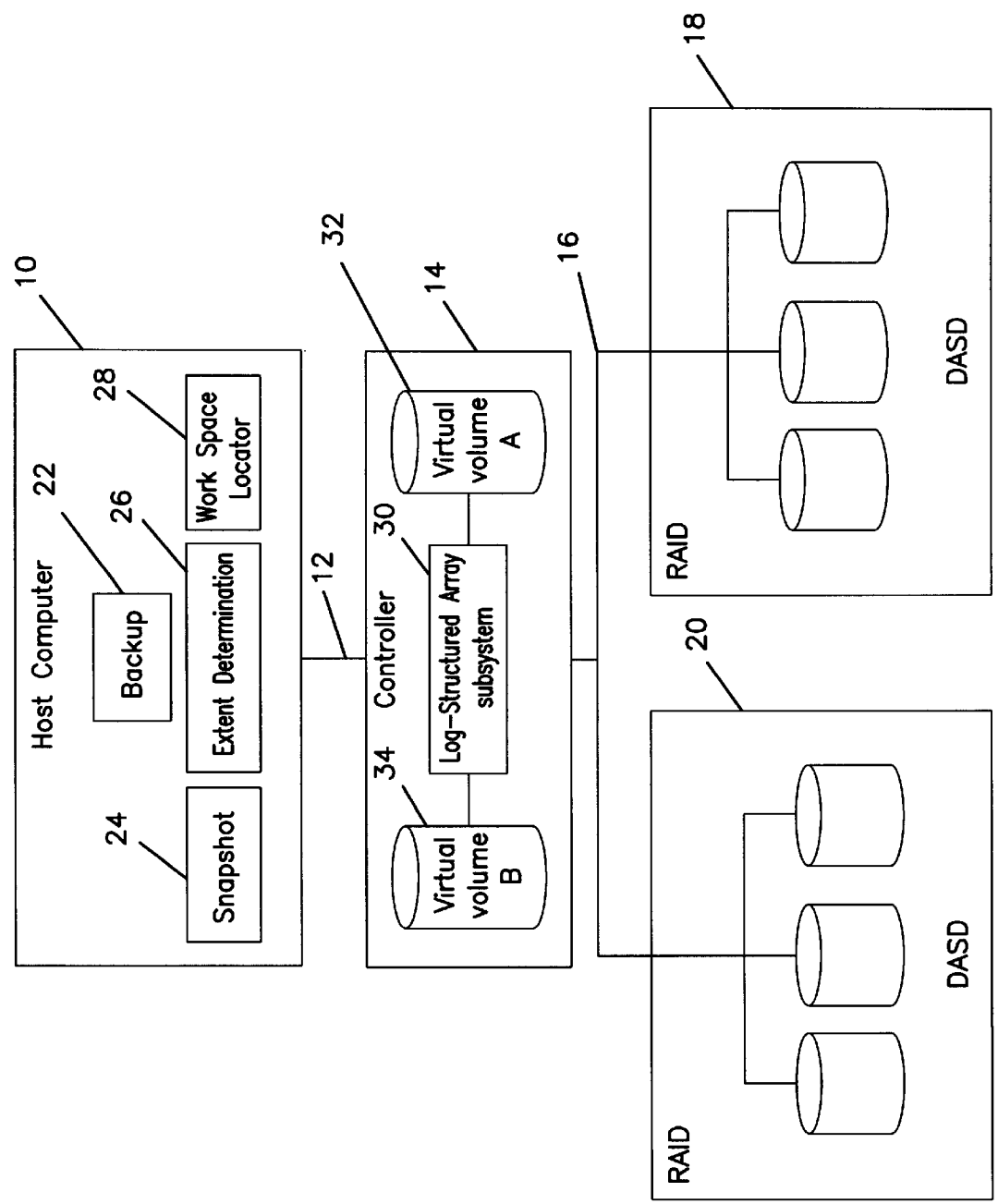
FIG. 1 is an exemplary hardware environment used to implement the preferred embodiment of the invention.

FIG. 1 is an exemplary hardware environment used to implement the preferred embodiment of the invention. A host computer 10 is coupled via a bus 12 to a storage controller 14, which itself is coupled via an I/O channel 16 to one or more data storage devices 18 and 20. In the preferred embodiment, the data storage devices 18 and 20 each comprise RAID (redundant arrays of inexpensive disks) storage subsystems, such as the RAMAC Virtual Array Storage System sold by IBM Corporation, the assignee of the present invention. Of course, those skilled in the art will recognize that any data storage device may be used with the present invention.

The host computer 10 executes one or more computer programs 22, 24, 26, and 28 that control the operation of the host computer 10 and its interaction with the storage controller 14. In the preferred embodiment, the computer programs 22, 24, 26, and 28 comprise a backup program 22, a snapshot program 24, an extent determination program 26, and a work space locator program 28, respectively, although other computer programs may be used as well.

Similarly, the storage controller 14 includes one or more computer programs 30 or other logic that controls the operation of the storage controller 14 and its interaction with the host computer 10 and data storage devices 18 and 20. In the preferred embodiment, the computer program 30 comprises a log-structured array (LSA) subsystem 30 that provides the access logic for the data storage devices 18 and 20, although other functions may be provided as well.

The LSA subsystem 30 constructs "virtual volumes" 32 and 34 (also labeled as A and B) in the memory of the storage controller 14 for access by the host computer 10. The virtual volumes 32 and 34 emulate standard DASD for data actually stored by the LSA subsystem 30 on the data storage devices 18 and 20. In this emulation, the host computer 10 (or any computer program executed thereby) "views" the virtual volumes 32 and 34 of the LSA subsystem 30 as normal data volumes, i.e., standard DASD, with sequentially numbered tracks. To accomplish this emulation, the LSA subsystem 30 maintains a virtual track table in the memory of the storage controller 12 for each virtual volume 32 or 34, wherein the virtual track table comprises one or more pointers representing one or more sequentially numbered virtual tracks and the pointers reference data stored on the data storage devices 18 and 20.

The present invention provides a point-in-time backup on the LSA subsystem 30 that is termed "Concurrent Copy Compatible Snapshot." The Concurrent Copy Compatible Snapshot function can be coordinated across multiple LSA subsystems 30 and also can be used to copy data to a target data storage device that is not an LSA subsystem 30.

In the Concurrent Copy Compatible Snapshot function, work space on a work virtual volume is obtained to hold the snapshot copy of the data from the source virtual volume. During the operation of the Concurrent Copy Compatible Snapshot function, updates to the source virtual volume are suspended (although for a very short time) so as to provide a logically consistent view of the source data on the source virtual volume at a common point in time. The Concurrent Copy Compatible Snapshot function operates by copying the pointers for the virtual tracks containing the source data from the virtual track table of the source virtual volume to the virtual track table of the work virtual volume without actually moving any of the source data on the data storage devices 18 or 20 referenced by those pointers. As a result, the snapshot function provides a method for copying the source data from the source virtual volume to the work virtual volume very quickly. Upon completion of the operation of the Concurrent Copy Compatible Snapshot function, updates to the source data on the source virtual volume may be resumed. Subsequently, a backup is performed in the usual manner, except that the backup retrieves the source data from the work virtual volume rather than the source virtual volume.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Those skilled in the art will also recognize that the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

VIRTUAL VOLUMES

Figure 2A:
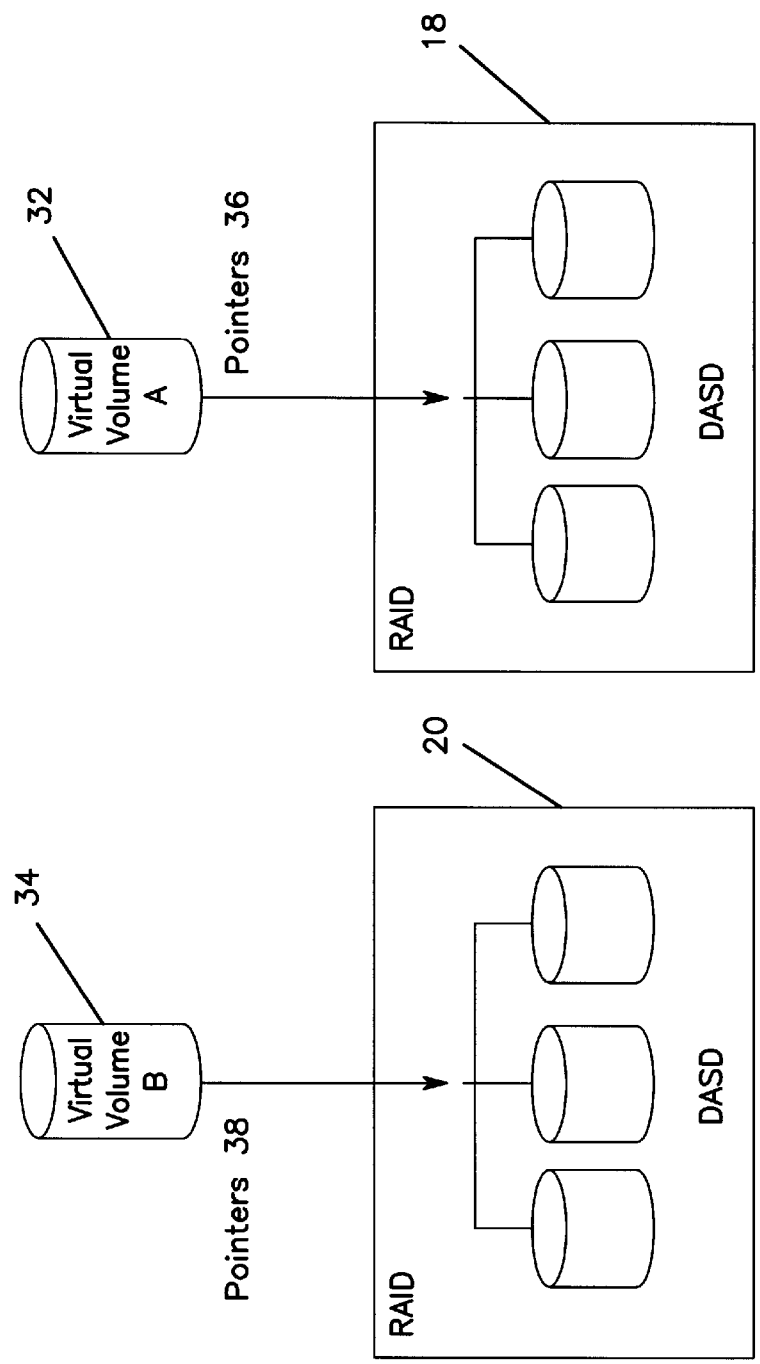
FIGS. 2A, 2B, and 2C illustrate a logical view of virtual volumes provided by the log-structured array subsystem before and after a snapshot function is executed.
Figure 2B:
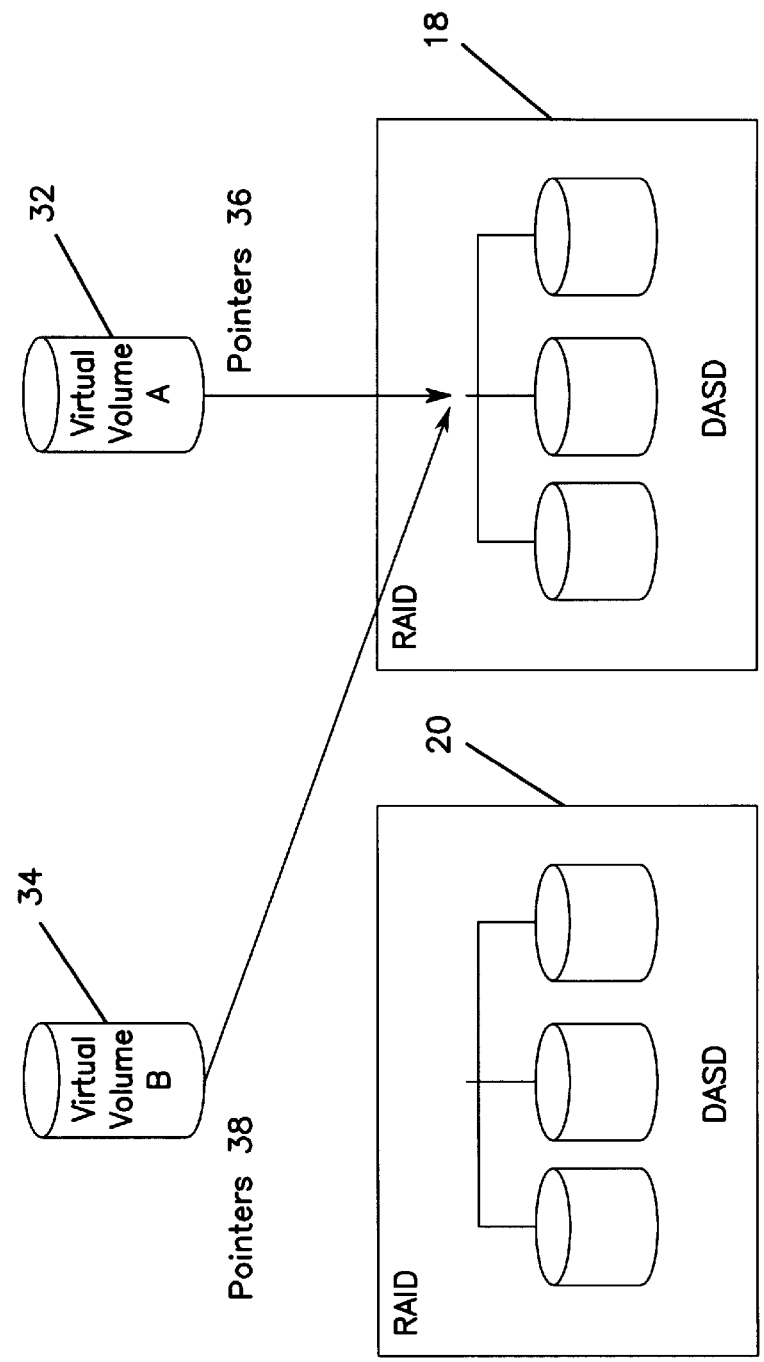
Figure 2C:
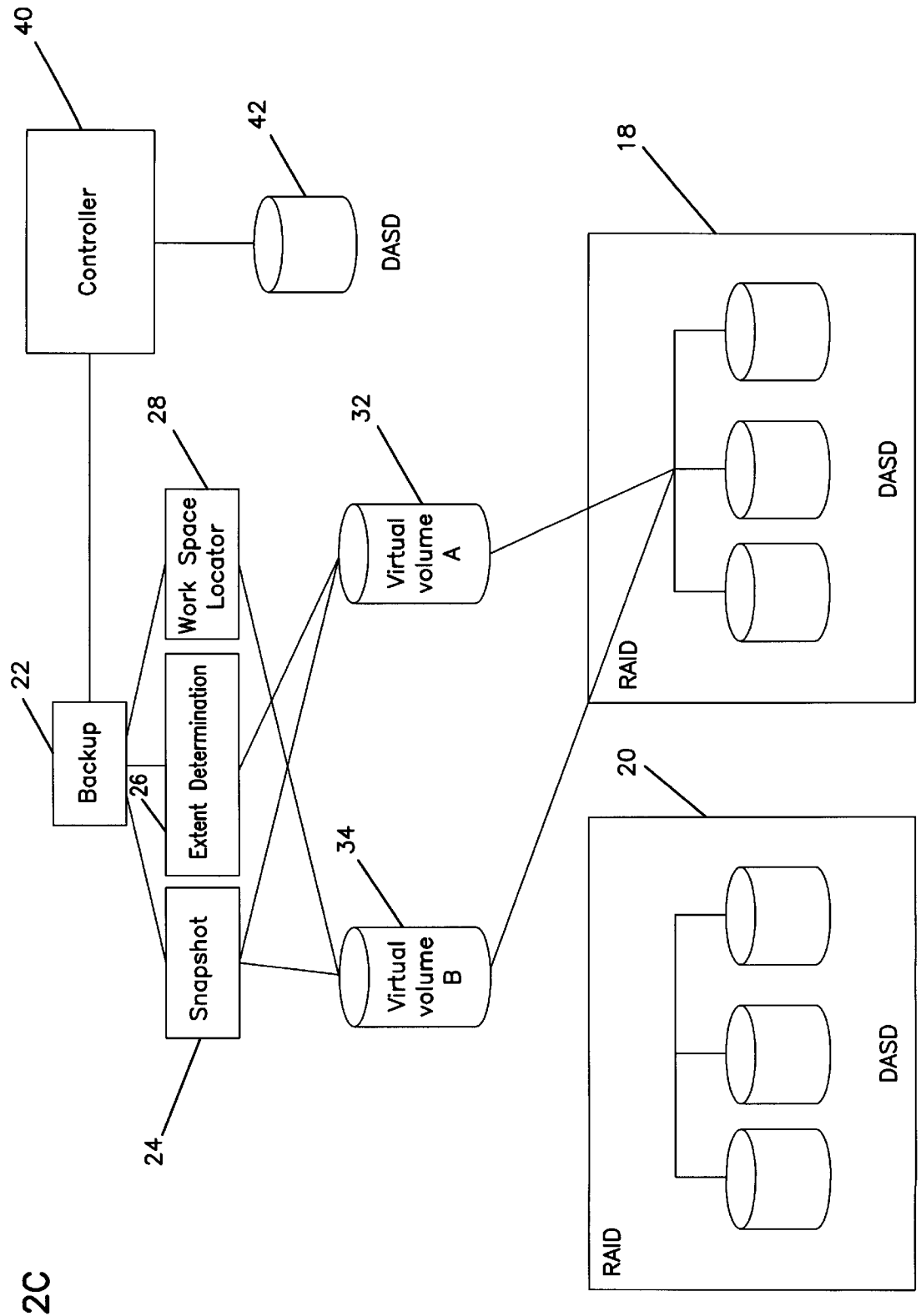

FIGS. 2A, 2B, and 2C illustrate the logical view of virtual volumes A and B (32 and 34) provided by the LSA subsystem 30 before and after a snapshot function is executed. The virtual volumes 32 and 34 and their contents are viewed by the host computer 10 and its programs as standard DASD having sequential tracks of data, and the logical and physical structure of the data storage devices 18 and 20 providing the actual storage space for these virtual volumes 32 and 34 are hidden from view by the LSA subsystem 30. Computer programs executed by the host computer 10 address data in the LSA subsystem 30 by virtual tracks of the virtual volumes 32 and 34, wherein each virtual volume 32 and 34 is comprised of a virtual track table having one or more pointers representing one or more sequential virtual tracks, and each of the pointers reference a corresponding location (or multiple locations) on the associated data storage device 18 and 20.

In FIG. 2B, a snapshot function has been executed by the LSA subsystem 30 to copy the virtual tracks containing the source data on virtual volume A (32) to virtual volume B (34). The result of the snapshot function is to set the pointers in the virtual track table of virtual volume B (34) to reference the same data locations on the data storage device 18 as the pointers in the virtual track table of virtual volume A (32). The data on the data storage device 20 previously pointed to by the pointers in the virtual track table of virtual volume B (34) is now inaccessible and the space it occupies on the data storage device 18 is available for reclamation and reuse. FIG. 2C illustrates a logical view of virtual volumes A and B provided by the LSA subsystem 30 during a point in time backup using the snapshot function. The LSA subsystem 30 is shown in the state after a snapshot function from the source virtual volume A (32) to a work virtual volume B (34) is executed, as described in FIG. 2A. The backup program 22, snapshot program 24, extent determining program 26, and work space locator 28 are all computer programs which are executed by the host processor 10 to perform these functions, wherein the backup program 22 is in control. These programs work together to back up the source data from the work virtual volume B (34) to a backup data storage subsystem, such as controller 40 and DASD 42. The steps performed in conjunction with this Figure are described in more detail below.

FLOWCHART

Figure 3:
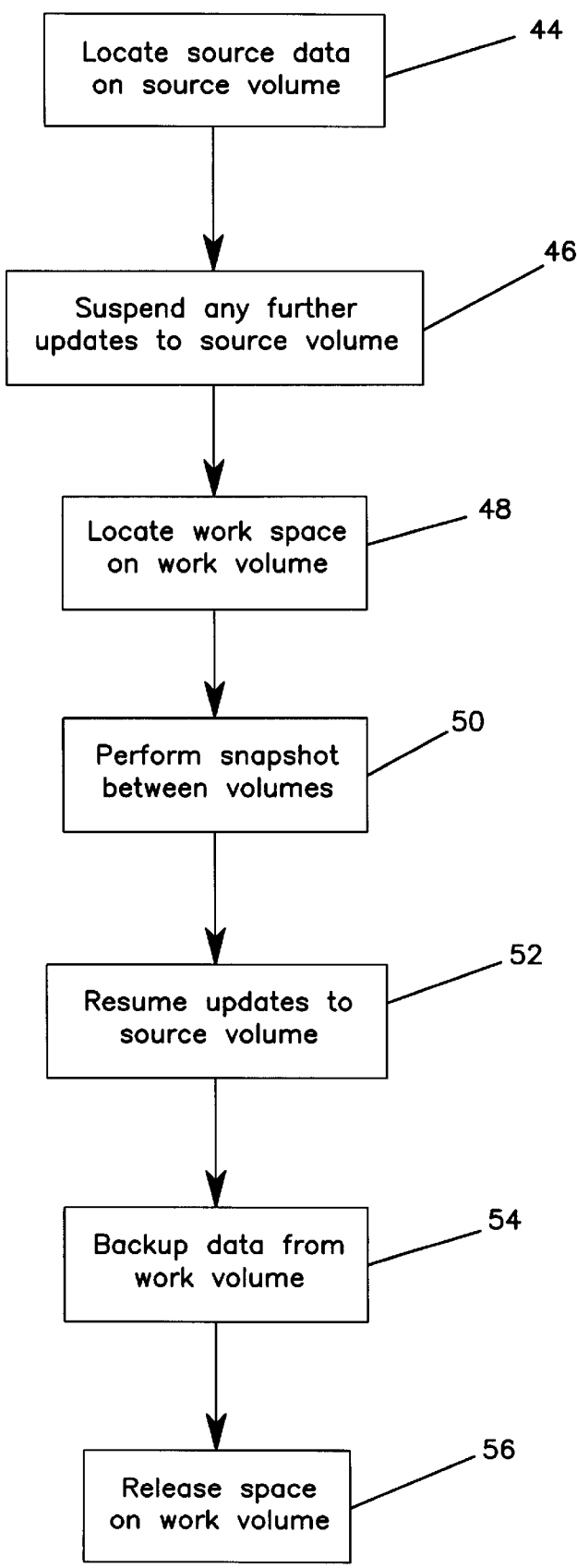
FIG. 3 is a flowchart illustrating the logic performed by a point in time backup using the snapshot function according to the present invention.

FIG. 3 is a flowchart that further illustrates the steps performed in a point in time backup using the snapshot function according to the present invention. The backup program 22 is in control of the execution of the following steps.

Block 44 represents the extent determining program 26 locating the virtual tracks on the source virtual volume A (32) that contain the source data which is to be backed up, and then returning information concerning the virtual tracks to the backup program 22.

Block 46 represents the host computer 10 suspending any further updates of the source data on the source virtual volume A (32). Generally, this step is invoked by an operator, by the backup program 22, or by some other program.

Block 48 represents the work space locator program 28 locating sufficient work space, i.e., unused virtual tracks, on the work virtual volume B (34) to contain the source data which is to be backed up from the source virtual volume A (32), and then returning information concerning the virtual tracks to the backup program 22. The LSA subsystem 20 considers the located work space as being reserved for the backup program 22, so that any subsequent request, whether internal or external, for this work space will be blocked.

Block 50 represents the snapshot program 24 updating the pointers from the virtual track table of the work virtual volume B (34) representing the work space so that they have the same values as the pointers from the virtual track table of the source virtual volume B (34) representing the source data. This is done by copying the pointers in the virtual track table for source virtual volume A (32) to the pointers in the virtual track table for the work virtual volume B (34). The backup program 22 records a correspondence between the virtual track location of the source data on the source virtual volume A (32) and the virtual track location of the work space on the work virtual volume B (34).

Block 52 represents the host computer 10 resuming further updates to the source data on the source virtual volume A (32). As with step 44 above, this step is invoked by an operator, by the backup program 22, or by some other program. Note, however, that these further updates affect only the virtual tracks of the source virtual volume A (32) representing the source data and do not affect the virtual tracks of the work virtual volume B (34) representing the work space. Since the LSA subsystem 20 implements log-structured storage, wherein updated virtual tracks of the source virtual volume A (32) are written to a new location at the end of the log-structured storage and their associated pointers in the virtual track table are reset to the new locations. However, the virtual tracks at the old location in the log-structured storage are not released as free space, even though they are no longer needed by the source virtual volume A (32), because they are still needed and pointed to by the work virtual volume B (34).

Block 54 represents the backup program 22 performing the steps normally used to backup the source data and then writing the backed up source data to the backup destination device, for example, controller 40 and DASD 42. However, in the present invention, the source data is retrieved from the virtual tracks on the work virtual volume B (34) representing the work space and containing the source data. These steps are performed by the backup program 22 translating requests for the source data to the work space using the recorded correspondence between the virtual track location of the source data on the source virtual volume A (32) and the virtual track location of the work space on the work virtual volume B (34).

Finally, Block 56 represents the LSA subsystem 20 releasing or freeing the work space obtained on the work virtual volume B (34) when the backup program 22 completes.

CONCLUSION

This concludes the description of the preferred embodiment of the invention. The following paragraphs describe some alternative methods of accomplishing the same objects.

In alternative embodiments of the present invention, other types and configurations of computers could be used. For example, the invention need not be restricted to the hardware and software configuration illustrated herein. For example, other mainframes, minicomputers, personal computers, or networks of computers could be used with the present invention. In another example, peripherals other than those illustrated herein could benefit from the present invention.

In alternative embodiments of the present invention, data storage devices other than those described herein could be used. For example, the log-structured storage could be implemented on different data storage devices than the log-structured array subsystem as illustrated herein.

In alternative embodiments of the present invention, other logic than that described herein could be performed without departing from the scope of the present invention. For example, the invention need not be restricted to the exact steps or elements illustrated herein.

In summary, the present invention discloses a method, apparatus, and article of manufacture for performing a point-in-time backup using a snapshot function. Work space on a work virtual volume is obtained to hold the snapshot copy of the source data being copied from a source virtual volume. Updates to the source virtual volume are suspended during the snapshot function, so as to provide a logically consistent view of the source virtual volume at a common point in time. Pointers are copied from a virtual track table of the source virtual volume to a virtual track table of the work virtual volume without actually moving any data on data storage devices referenced by those pointers. As a result, the snapshot function provides a method for copying the source virtual volume to the work virtual volume very quickly. Upon completion of the snapshot function, updates to the source virtual volume may be resumed. Subsequently, a backup is performed in the usual manner, except that the backup retrieves the source data from the work virtual volume rather than the source virtual volume.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of performing a backup of source data, comprising:
    (a) identifying source data tracks on a source volume, wherein the source volume comprises pointers to the source data tracks in a storage device;
    (b) performing a snapshot from the source volume to a work volume to copy the source data from the source volume to the work volume, wherein following the snapshot the work volume includes a copy of the pointers in the source volume to the source data tracks in the storage device;
    (c) performing a point-in-time backup copy of the source data tracks from the snapshot copy of the source data in the work volume; and
    (d) during the point-in-time backup, writing updates to the source volume tracks to storage tracks that are different from the source data tracks to which the work volume points, wherein after the update the source volume points to the source data tracks including the updates to the source data.

2. The method of claim 1, wherein the source and work volumes are virtual volumes created using log-structured storage.

3. The method of claim 2, further comprising the step of maintaining a virtual track table for each of the virtual volumes, wherein the virtual track table stores one or more pointers representing one or more sequentially numbered virtual tracks and the pointers reference data stored on one or more data storage devices.

4. The method of claim 2, further comprising:
    obtaining work space on the work virtual volume to hold the snapshot of the source data being copied from a source virtual volume;
    suspending updates to the source virtual volume, so as to provide a logically consistent view of the source virtual volume at a common-point-in-time, wherein performing the snapshot from the source volume to the work volume comprises:
        (i) copying one or more pointers from a virtual track table of the source virtual volume to a virtual track table of the work virtual volume without actually moving any data on the data storage devices referenced by the pointers;
        (ii) allowing updates to the source virtual volume to resume after the snapshot copying is completed.

5. The method of claim 4, further comprising reserving the work volume to block any subsequent request for the work volume.

6. The method of claim 4, wherein the backing up step further comprises the steps of retrieving the source data from the work virtual volume and then writing the retrieved source data to another device.

7. The method of claim 1, further comprising:
    inhibiting a release of the source data tracks pointed to by the work volume as free space during the point-in-time backup operation; and
    designating the source data tracks pointed to by the work volume as free space after the point-in-time backup operation.

8. A system for performing a backup of source data, comprising:
    (a) a computer having a data storage device connected thereto; and
    (b) one or more computer programs, executed by the computer, for:
        (i) identifying source data tracks on a source volume, wherein the source volume comprises pointers to the source data tracks in a storage device;
        (ii) performing a snapshot from the source volume to a work volume to copy the source data from the source volume to the work volume, wherein following the snapshot the work volume includes a cope of the pointers in the source volume to the source data tracks in the storage device;
        (iii) performing a point-in-time backup copy of the source data tracks from the snapshot copy of the source data in the work volume; and
        (iv) during the point-in-time backup writing updates to the source volume tracks to storage tracks that are different from the source data tracks to which the work volume points, wherein after the update the source volume points to the source data tracks including the updates to the source data.

9. The system of claim 8, wherein the source and work volumes are virtual volumes created using log-structured storage.

10. The system of claim 9, further comprising maintaining a virtual track table for each of the virtual volumes, wherein the virtual track table stores one or more pointers representing one or more sequentially numbered virtual tracks and the pointers reference data stored on one or more data storage devices.

11. The system of claim 9, wherein the program further performs:
    obtaining work space on the work virtual volume to hold the snapshot of the source data being copied from a source virtual volume;
    suspending updates to the source virtual volume, so as to provide a logically consistent view of the source virtual volume at a common-point-in-time, wherein performing the snapshot form the source volume to the work volume comprises:
        (i) copying one or more pointers from a virtual track table of the source virtual volume to a virtual track table of the work virtual volume without actually moving any data on the data storage devices referenced by the pointers;
        (ii) allowing updates to the source virtual volume to resume after the snapshot copying is completed.

12. The system of claim 11, wherein the program further performs reserving the work volume to block any subsequent request for the work volume.

13. The system of claim 8, further comprising:
    inhibiting a release of the source data tracks pointed to by the work volume as free space during the point-in-time backup operation; and
    designating the source data tracks pointed to by the work volume as free space after the point-in-time backup operation.

14. An article of manufacture embodying logic that causes a processor to perform a backup of source data, comprising:
    (a) identifying source data tracks on a source volume, wherein the source volume comprises pointers to the source data tracks in a storage device;
    (b) performing a snapshot from the source volume to a work volume to copy the source data from the source volume to the work volume, wherein following the snapshot the work volume includes a copy of the pointers in the source volume to the source data tracks in the storage device;
    (c) performing a point-in-time backup copy of the source data tracks from the snapshot copy of the source data in the work volume; and (d) during the point-in-time backup, writing updates to the source volume tracks to storage tracks that are different from the source data tracks to which the work volume points, wherein after the update the source volume points to the source data tracks including the updates to the source data.

15. The article of manufacture of claim 14, wherein the source and work volumes are virtual volumes created using log-structured storage.

16. The article of manufacture of claim 15, further comprising maintaining a virtual track table for each of the virtual volumes, wherein the virtual track table stores one or more pointers representing one or more sequentially numbered virtual tracks and the pointers reference data stored on one or more data storage devices.

17. The article of manufacture of claim 16, further comprising:

obtaining work space on the work virtual volume to hold the snapshot of the source data being copied from a source virtual volume;

suspending updates to the source virtual volume, so as to provide a logically consistent view of the source virtual volume at a common-point-in-time, wherein performing the snapshot form the source volume to the work volume comprises:

(i) copying one or more pointers from a virtual track table of the source virtual volume to a virtual track table of the work virtual volume without actually moving any data on the data storage devices referenced by the pointers;

(ii) allowing updates to the source virtual volume to resume after the snapshot copying is completed.

18. The article of manufacture of claim 17, wherein the program further performs reserving the work volume to block any subsequent request for the work volume.

19. The article of manufacture of claim 14, further comprising:

inhibiting a release of the source data tracks pointed to by the work volume as free space during the point-in-time backup operation; and designating the source data tracks pointed to by the work volume as free space after the point-in-time backup operation.

20. The article of manufacture of claim 14, wherein the back-up copy operation further comprises retrieving the source data from the work virtual volume and writing the retrieves source data to another device.

\* \* \* \* \*

UNITED STATES PATENT AND TRADEMARK OFFICE
CERTIFICATE OF CORRECTION

PATENT NO. : 6,212,531 B1
DATED : April 3, 2001
INVENTOR(S) : Blea et al.

It is certified that error appears in the above-identified patent and that said Letters Patent is hereby corrected as shown below:

Column 8,
Line 7, delete "cope" and insert -- copy --

Column 10,
Line 22, delete "retrieves" and insert -- retrieved --

Signed and Sealed this

Twenty-sixth Day of October, 2004

JON W. DUDAS
*Director of the United States Patent and Trademark Office*